Patented Oct. 17, 1922.

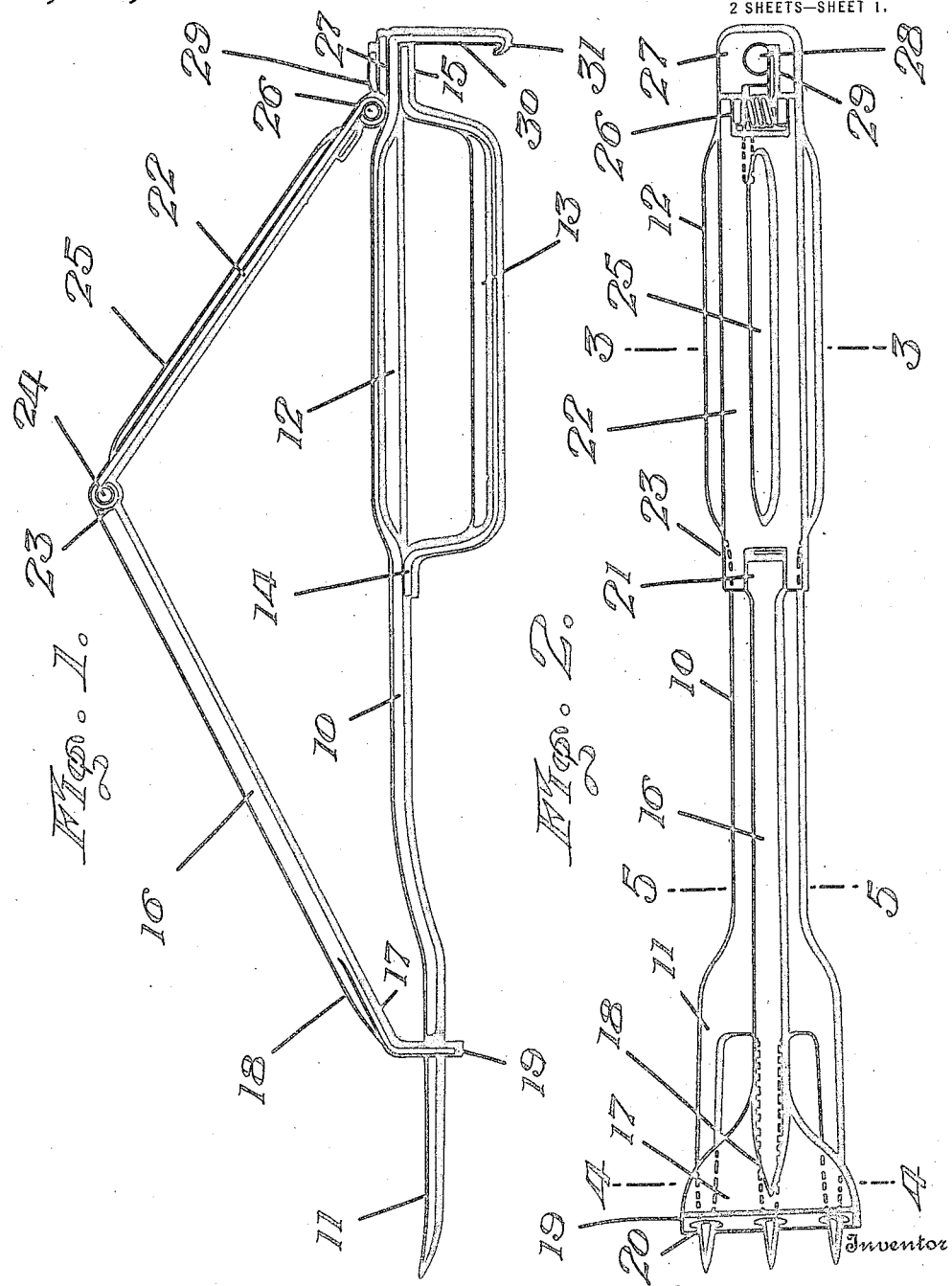

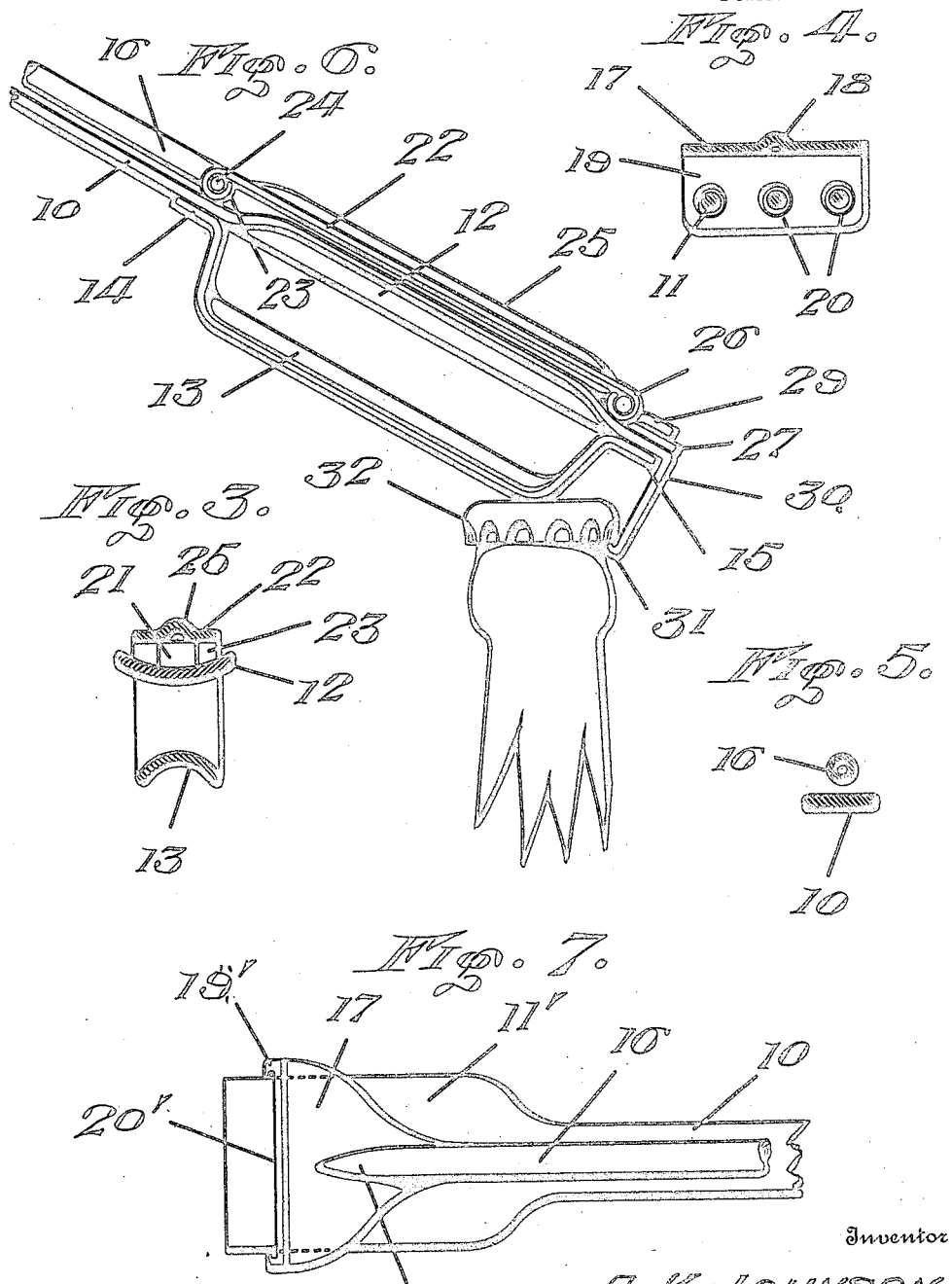

1,432,108

UNITED STATES PATENT OFFICE.

ALEXANDER KENDRICK JOHNSON, OF NASHVILLE, TENNESSEE.

FORK OR PADDLE.

Application filed June 4, 1920. Serial No. 386,433.

*To all whom it may concern:*

Be it known that I, ALEXANDER K. JOHNSON, a citizen of the United States, residing at Nashville, in the county of Davidson and State of Tennessee, have invented certain new and useful Improvements in Forks or Paddles; and I do hereby declare the following to be a full, clear, and exact description of the invention, such as will enable others skilled in the art to which it appertains to make and use the same.

The present invention relates to a fork or paddle, and aims to provide such an implement for handling vegetables, meat, lard, butter and other food stuffs in a sanitary way, and provided with novel and improved means for ejecting the object held by the fork or paddle without touching same by the fingers.
The object of the invention is the provision of an ejecting means assembled with the fork or paddle in a novel manner, and constructed of sheet metal in such a way as to be thoroughly practical and efficient in operation, and including improvements in detail to enhance the utility of the implement.

A further object is the provision of a guard for the handle to prevent the fingers slipping when manipulating the implement.

A still further object is the combination in such an implement of a bottle cap remover utilizing the guard as a fulcrum.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is an edge view of the implement showing the ejector retracted.

Fig. 2 is a plan view of the implement, constructed as a fork, with the ejector in advanced position.

Figs. 3, 4 and 5 are cross sectional details taken on the respective lines 3—3, 4—4 and 5—5 of Fig. 2.

Fig. 6 is a fragmentary edge view of the implement, showing the same in use for removing a bottle cap.
Fig. 7 is a fragmentary plan view showing a paddle instead of a fork, the improvements being useful for both.

The implement comprises a flat metal shank 10 which, as shown in Figs. 1, 2 and 4, has a fork 11 at one end, for handling vegetables, meat, and other objects. The implement thus serves as a cooking fork for handling hot objects and also serving them without touching same by the fingers, to provide for sanitary handling of the objects. The shank 10 is provided at its other end portion with a widened handle 12, and said handle is concaved transversely to present a convexed surface to the fingers which pass under the handle in manipulating the fork, and presenting a broad surface to the hand.

In order to prevent the fork from slipping when in use, a guard 13 is provided, said guard extending below the handle parallel therewith, and being of a curved cross section reverse to the curvature of the handle 12, to present a transversely convexed surface to the fingers and facilitating the insertion of the fingers without contacting with the edges of the metal. The guard 13 has its end portions 14 and 15 offset toward the handle 12 and riveted or otherwise secured to the end portions of the handle. The handle and guard being of curved section will not only conveniently accommodate the fingers of the hand, but will also stiffen them longitudinally thereof to withstand rough use.

The ejector comprises a stem 16 formed of sheet metal and of tubular construction, the metal being bent transversely into a tube with the edges meeting at the bottom, as seen in Fig. 5, and the metal at the forward end of the stem 16 is widened and flattened out to provide the ejector blade 17 having a central corrugation 18 into which the forward end of the stem 16 merges, thus providing a stiff and strong connection between the stem and blade. The blade has a lip 19 bent at an angle therefrom and provided with apertures 20 through which the tines of the fork extend, thereby slidably mounting the ejector blade on the fork. The inner or rear end of the stem 16 is formed with a hinge butt 21 for connection with the operating means as presently described. In order to operate the ejector, an arm 22 is employed, the same comprising a clamp bar or plate of sheet metal provided at its forward end with a bifurcation and hinge butts 23 receiving the hinge butt 21 of the stem 16, and a hinge pin 24 extends through said hinge butts to hingedly connect the stem 16 and arm 22. The arm 22 has a longitudinal corrugation or rib 25 struck upwardly therefrom for the contact of the thumb of the hand, and to also stiffen said arm against bending movement under the pressure of the thumb, as well as enabling the thumb to slide along the corrugation or rib easily in manipulating the fork. The arm 22 is mounted on the implement for swinging movement, the rear or inner end of the arm being hinged, as at 26, to a hinge leaf 27 secured on the inner or rear end portion of the handle 12 opposite to the end portion 15 of the guard 13 preferably by the same rivet 28 which fastens said end portion of the guard to the handle. The hinge 26 has a torsion spring 29 which exerts a tension for swinging the arm 22 upwardly away from the handle, whereby to pull the stem 16 with said arm and thereby retract the ejector, as seen in Fig. 1. The fork 11 can then be stuck into the object for handling same, with the fingers of the hand passing through the slot between the handle 12 and guard 13, and the thumb bearing on the arm 22. To eject the object from the fork, the arm 22 is pressed down by the thumb, thereby advancing the ejector by a toggle action, and straightening out the stem 16 and arm 22, as seen in Figs. 2 and 6, whereby the lip 19 is moved forwardly on the fork to push the object from same. Objects which have a tendency to cling or stick on the fork, can thus be ejected therefrom easily, and when the pressure of the thumb is removed from the arm 22, the spring 29 returns the arm 22 and ejector to retracted position.

The implement also has combined therewith a bottle cap remover. Thus, the inner or rear end of the handle 12 has an extension 30 projecting at an angle toward the side at which the guard 13 is located, and the extension 30 is provided at the end thereof with a hook 31 to engage under the edge of the cap 32, as seen in Fig. 6, while the inner or rear end of the guard 13 seats on the cap and serves as a fulcrum. Pressure applied to the shank 10 will easily loosen and remove the cap.

The improvements are also useful on a paddle, as well as a fork, reference being had to Fig. 7 wherein the shank 10 has a paddle blade 11' instead of a fork, and the ejector blade 17 has the lip 19' extending at an angle and provided with slot 20' through which a blade 11' extends, said ejector moving on the paddle blade in the same manner that the ejector works on the fork 11 as above described. The paddle when used for handling lard, butter and the like, can be readily cleared by the operation of the ejector which will remove the matter from the paddle in a sanitary way.

Having thus described the invention, what is claimed as new is:—

An implement comprising a substantially flat metal shank having a blade at one end and a handle at the other end, a guard below the handle having its end portions offset to the handle, a hinge leaf on that end portion of the handle opposite to the blade, means securing said hinge leaf and corresponding end portion of the guard to the handle, a flat metal arm having one end hinged to said leaf and having an upstruck rib for the contact of the thumb, a spring associated with the hinge connection between said arm and leaf for swinging the arm away from the handle, and a sheet metal ejector having a tubular stem with one end hingedly connected to the other end of said arm, and the other end portion of the stem being flattened out and having a lip extending downwardly at an angle and slidable on the blade, the flattened portion having a corrugation merging into the stem.

In testimony whereof I have signed my name to this specification in the presence of two subscribing witnesses.

ALEXANDER KENDRICK JOHNSON.

Witnesses:
A. C. S. JACKSON,
C. W. TURPIN.